United States Patent
Proctor et al.

(10) Patent No.: US 7,505,764 B2
(45) Date of Patent: Mar. 17, 2009

(54) METHOD FOR RETRANSMITTING A SPEECH PACKET

(75) Inventors: Lee Michael Proctor, Cary, IL (US); James Patrick Ashley, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 1192 days.

(21) Appl. No.: 10/695,009

(22) Filed: Oct. 28, 2003

(65) Prior Publication Data

US 2005/0089003 A1    Apr. 28, 2005

(51) Int. Cl.
H04W 24/00    (2006.01)
H04L 12/66    (2006.01)
G10L 21/00    (2006.01)
G10L 19/12    (2006.01)

(52) U.S. Cl. ............... 455/423; 370/352; 704/201; 704/221

(58) Field of Classification Search ............ 370/352; 455/423; 704/201, 221
See application file for complete search history.

(56) References Cited

U.S. PATENT DOCUMENTS

| | | | |
|---|---|---|---|
| 5,519,779 A | | 5/1996 | Proctor et al. |
| 5,599,478 A | | 2/1997 | Matumoto et al. |
| 5,657,420 A | * | 8/1997 | Jacobs et al. ............... 704/223 |
| 5,751,704 A | * | 5/1998 | Kostic et al. ............... 370/335 |
| 5,778,338 A | * | 7/1998 | Jacobs et al. ............... 704/223 |
| 5,864,560 A | * | 1/1999 | Li et al. ..................... 370/465 |
| 5,898,696 A | | 4/1999 | Proctor et al. |
| 6,034,971 A | | 3/2000 | Love et al. |
| 6,249,894 B1 | | 6/2001 | Lin et al. |
| 6,477,502 B1 | * | 11/2002 | Ananthpadmanabhan et al. ................... 704/503 |
| 6,584,438 B1 | * | 6/2003 | Manjunath et al. ......... 704/228 |
| 6,718,296 B1 | * | 4/2004 | Reynolds et al. ......... 704/200.1 |
| 6,980,528 B1 | * | 12/2005 | LeBlanc et al. ............ 370/290 |
| 7,062,264 B2 | * | 6/2006 | Ko et al. .................... 455/423 |
| 7,111,049 B1 | * | 9/2006 | Granger et al. ............. 709/216 |
| 7,161,931 B1 | * | 1/2007 | Li et al. ..................... 370/352 |

\* cited by examiner

Primary Examiner—Michael N Opsasnick
(74) Attorney, Agent, or Firm—Lalita W. Pace (57) ABSTRACT

The invention provides a method of retransmitting a speech packet. In one embodiment, the method includes receiving (S702) at a transmitting device (140) a first negative acknowledgement (NACK) from a receiving device (120). The NAK indicates a corrupted first speech packet transmission. The transmitting device then retrieves (S706) a first speech packet associated with the first NACK and compresses (S714-S720) the speech packet to form a replacement speech packet. Next, a current segment of speech is encoded (S808) to form a current speech packet and current speech packet is combined with the replacements speech packet. The combined speech packet is then transmitted (S814) to the receiving device.

13 Claims, 6 Drawing Sheets

FIG. 4

| FIELD | PACKET TYPE | | | |
|---|---|---|---|---|
| | RATE 1 | RATE 1/2 | RATE 1/8 | BLANK |
| SPECTRAL TRANSITION INDICATOR | 1 | | | |
| LSP | 28 | 22 | 8 | |
| PITCH DELAY | 7 | 7 | | |
| DELTA DELAY | 5 | | | |
| ACB GAIN | 9 | 9 | | |
| FCB SHAPE | 105 | 30 | | |
| FCB GAIN | 15 | 12 | | |
| FRAME ENERGY | | | 8 | |
| (RESERVED) | 1 | | | |
| TOTAL | 171 | 80 | 16 | 0 |

TABLE 1

METHOD FOR RETRANSMITTING A SPEECH PACKET

FIELD OF THE INVENTION

This invention relates generally to vocoder systems, and more specifically to retransmission of dropped packets in vocoder systems.

BACKGROUND OF THE INVENTION

Vocoders are designed to compress voice signals to lower data rates by utilizing certain voice characteristics. In Code Division Multiple Access (CDMA) systems variable rate vocoders are utilized, which vary the data rate based on the current speech activity. One such currently deployed vocoder is the Enhanced Variable Rate Codec (EVRC) specified in IS-127. EVRC utilizes three data rates: full, half and eighth rate. Typically full rate is used when there is speech activity, eighth rate when there is no activity and is usually representative of the background noise. Half rate is used for transition periods and also when signaling/control information needs to be multiplexed with the speech information. Note that EVRC is an example of a Rate Set 1 vocoder, corresponding to a maximum data rate of 8 Kbps. CDMA also supports Rate Set 2 vocoders corresponding to a maximum data rate of 13 Kbps.

It is well known that in CDMA systems the capacity of the air interface is inversely proportional to the power transmitted by the constituent channels. Thus it is beneficial to keep power transmission to a minimum. However, the lower the transmission power the more likely a packet is to be lost, or erased, on the air interface. Excessive packet loss will result in unacceptable voice quality. A power control algorithm is therefore used to dynamically adjust transmission power to maintain a fairly constant rate of erased frames termed a Frame Erasure Rate (FER). Typically a voice channel is maintained at an erasure rate of approximately 1% so as to maintain adequate voice quality.

By introducing retransmission capabilities the transmission power can be decreased while maintaining an overall acceptable voice quality. For example while operating at a FER of 10%, 1 in 10 frames will be erased on original transmission but because the erased frames are retransmitted an overall voice packet erasure rate of 1% (10%*10%) is achieved. However, there is only limited channel bandwidth available and there may not be bandwidth available to retransmit the packet as well as transmit a current packet. For example if the retransmitted packet was Full Rate and the current packet was also at Full Rate.

Thus a method of retransmitting a voice packet in a limited bandwidth channel while maintaining adequate voice quality is desirable.

SUMMARY OF THE INVENTION

One aspect of the present invention provides a method for operating a vocoder system comprising receiving a first negative acknowledgement from a receiving communication device indicative of a corrupted first speech packet transmission, retrieving a first speech packet associated with the first negative acknowledgement, compressing the first speech packet to form a replacement speech packet, encoding a current segment of speech responsive to the first negative acknowledgement to form a current speech packet, combining the current speech packet with the replacement speech packet to form a combined speech packet and transmitting the combined speech packet.

A second aspect of the present invention provides a method of operating a vocoder system comprising receiving a combined speech packet at a receiving communication device, wherein the combined speech packet comprises a current speech packet and a replacement speech packet and wherein the replacement speech packet is formed by stripping speech parameters from a first speech packet, generating replacement speech parameters using the stripped speech parameters from the first speech packet and the speech parameters from a preceding speech packet, and applying the generated speech parameters to the replacement speech packet. The second aspect of the present invention also provides stripping the replacement speech packet from the combined speech packet, stripping the current speech packet from the combined speech packet, placing the current speech packet in a receiver buffer, sequencing the stripped replacement speech packet in sequential position with the speech packets leaving the receiver buffer, sending the sequenced replacement speech packet to a speech decoder and decoding the sequenced replacement speech packet.

A third aspect of the present invention provides a method for forming a combined packet comprising encoding a current speech segment at a substantially half rate, retrieving a first speech packet, compressing the first speech packet to a substantially half rate and combining the encoded current speech segment and the compressed first speech packet to form a full rate replacement packet.

A fourth aspect of the present invention provides a computer usable medium storing a computer program for operating a vocoder system comprising, computer readable code for receiving a first negative acknowledgement from a receiving communication device indicative of a corrupted first speech packet transmission, computer readable code for retrieving a first speech packet associated with the first negative acknowledgement, computer readable code for compressing the first speech packet to form a replacement speech packet, computer readable code for encoding a current segment of speech responsive to the first negative acknowledgement to form a current speech packet, computer readable code for combining the current speech packet with the replacement speech packet to form a combined speech packet and computer readable code for transmitting the combined speech packet.

A fifth aspect of the present invention provides a computer usable medium storing a computer program for operating a vocoder system comprising computer readable code for receiving a combined speech packet at a receiving communication device, wherein the combined speech packet comprises a current speech packet and a replacement speech packet, computer readable code for stripping the replacement speech packet from the combined speech packet, computer readable code for stripping the current speech packet from the combined speech packet, computer readable code for placing the current speech packet in a receiver buffer, computer readable code for sequencing the stripped replacement speech packet in sequential position with the speech packets leaving the receiver buffer, computer readable code for sending the sequenced replacement speech packet to a speech decoder and computer readable code for decoding the sequenced replacement speech packet.

A sixth aspect of the present invention provides a computer usable medium storing a computer program for forming a combined packet comprising computer readable code for encoding a current speech segment at a substantially half rate, computer readable code for retrieving a first speech packet, computer readable code for compressing the first speech packet to a substantially half rate and computer readable code for combining the encoded current speech segment and the compressed first speech packet to form a full rate combined packet.

The foregoing device and other devices as well as features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

BRIEF DESCRIPTION OF THE DRAWINGS

The present invention is illustrated by way of example and not limitation in the accompanying figures, in which like references indicate similar elements, and in which.

DETAILED DESCRIPTION OF THE DRAWINGS

Figure 1:
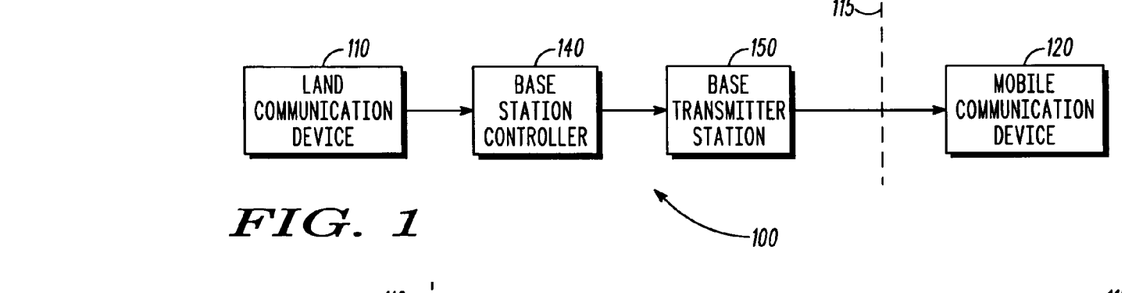
FIG. 1 illustrates schematically an exemplary wireless transmission system from a land communication device to a mobile communication device.

FIG. 1 illustrates schematically an exemplary wireless transmission system 100 from an initiating land communication device 110 to a receiving mobile communication device 120. The land communication device 110 transmits a signal to a base station controller 140, which transmits the signal to a base transmitter station 150. The base transmitter station 150 transmits the signal through an air interface 115 to a mobile communication device 120.

Figure 2:
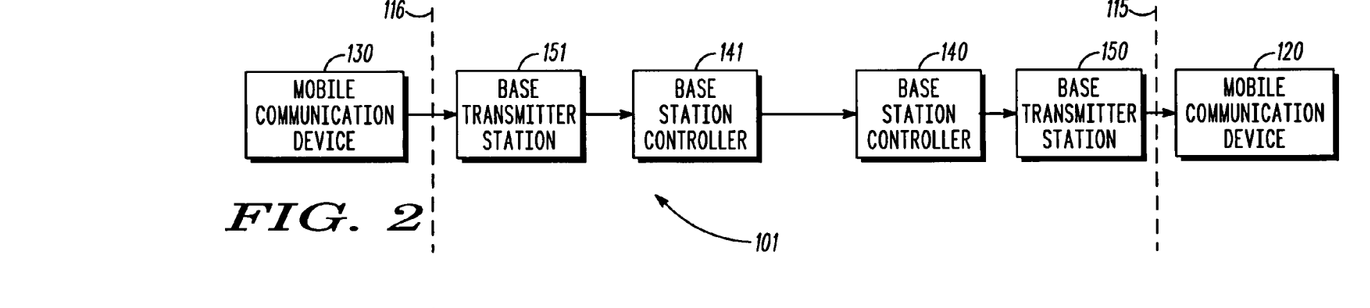
FIG. 2 illustrates schematically an exemplary wireless transmission system from a mobile communication device to a mobile communication device.

FIG. 2 illustrates schematically an exemplary wireless transmission system 101 from an initiating mobile communication device 130 to a receiving mobile communication device 120. The mobile communication device 130 transmits a signal through a first air interface 116 to a base transmitter station 151. The base transmitter station 151 transmits the signal to a first base station controller 141, which transmits the signal to a second base station controller 140. The second base station controller 140 transmits the signal to a base transmitter station 150, which transmits the signal through a second air interface 115 to a mobile communication device 120. In some embodiments of the present invention, the second base station controller 140 is not required for the transmission and the first base station controller 141 transmits the signal to the base transmitter station 150.

Figure 3:
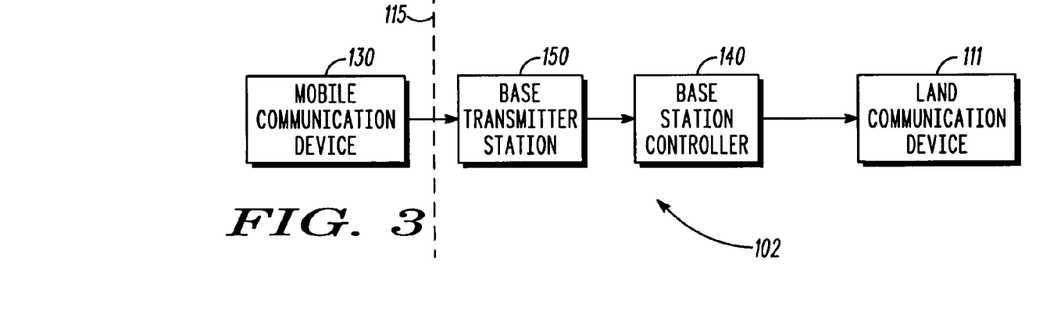
FIG. 3 illustrates schematically an exemplary wireless transmission system from a mobile communication device to a land communication device.

FIG. 3 illustrates schematically an exemplary wireless transmission system 102 from an initiating mobile communication device 130 to a receiving land communication device 111. The mobile communication device 130 transmits a signal through an air interface 115 to a base transmitter station 150, which transmits the signal to a base station controller 140. The base station controller 140 transmits the signal to a land communication device 111.

FIGS. 1-3 include the transmission of a signal through at least one air interface 115. This air transmission is susceptible to dropping of speech packets during transmission in a wireless system. In order to have high quality voice with low transmission power on a cellular phone, retransmission of the dropped packets is required.

Figure 4:
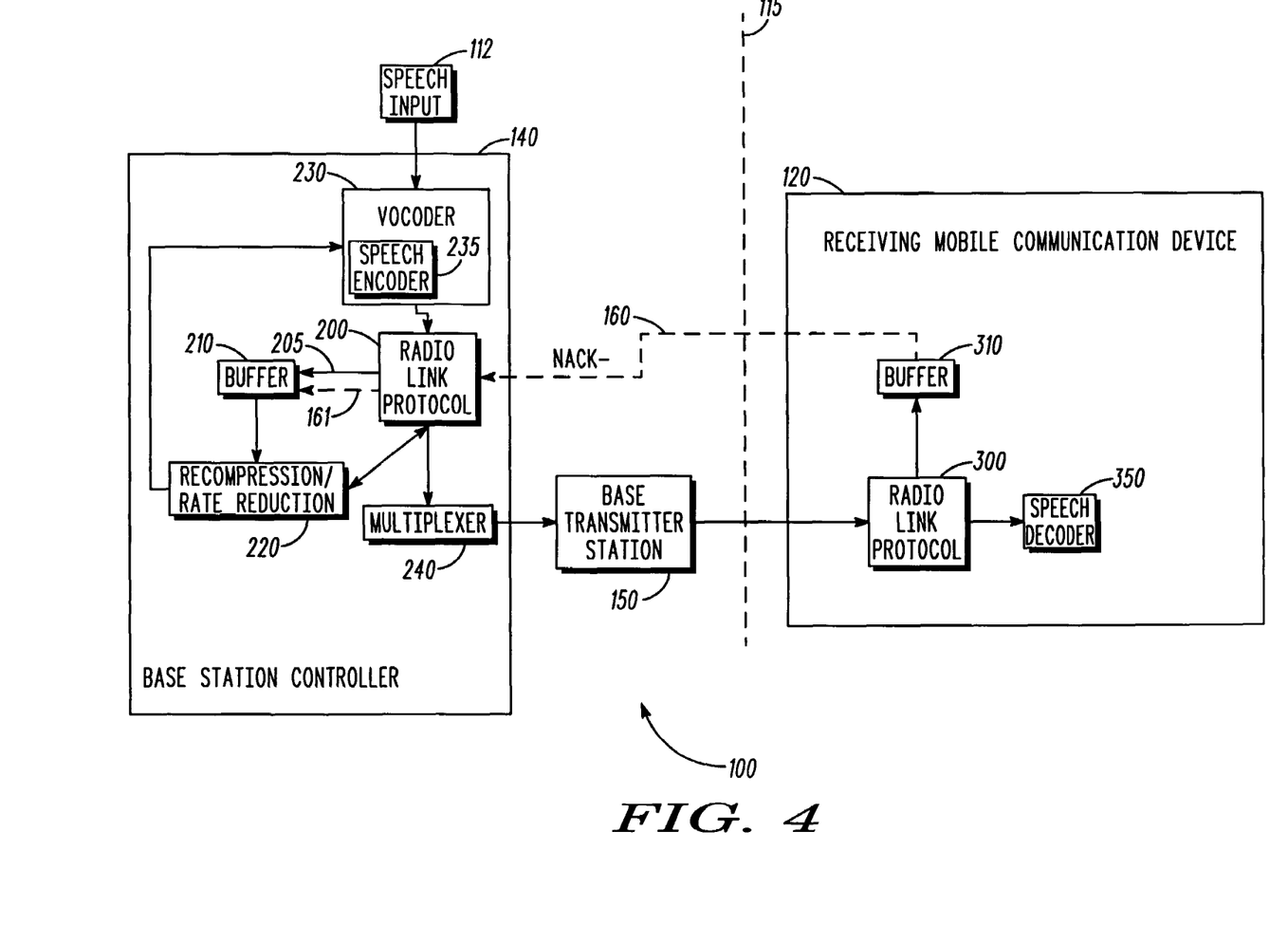
FIG. 4 illustrates in block diagram a vocoder interaction according to the present invention.

FIG. 4 illustrates in block diagram a vocoder interaction according to the present invention for the exemplary wireless transmission system 100 illustrated in FIG. 1. A computer usable medium stores a computer program to operate a vocoder system within the exemplary wireless transmission system 100. Speech input 112 is received at the base station controller 140 from the land communication device 110 of FIG. 1. The speech input 112 is received at the vocoder 230, which contains a speech encoder 235. The speech encoder 235 segments the received speech input 112 into segments. In one embodiment, the speech encoder 235 segments the received speech input 112 into 20 ms segments.

Each speech segment is evaluated for level of speech activity by a rate determination algorithm and then compressed at the speech encoder 235 using a speech encoder algorithm, such as, for example, enhanced variable rate codec (EVRC), into a packet comprising a set of speech parameters. In the preferred embodiment a sequence number is appended by the Radio Link Protocol (RLP). to the packet containing the speech parameters to form a speech packet. However, in an alternative embodiment no sequence number is required. The phrase "speech packet" as used here is synonymous with the word "frame," as is known to those of ordinary skill in the art.

Vocoder technology, as is known to those of skill in the art, encodes voice segments that contain speech at a first rate. Voice segments, which contain no speech are encoded at a third rate. Transitional voice segments are encoded into a second rate packet for a step down from speech to no speech.

Figure 5:
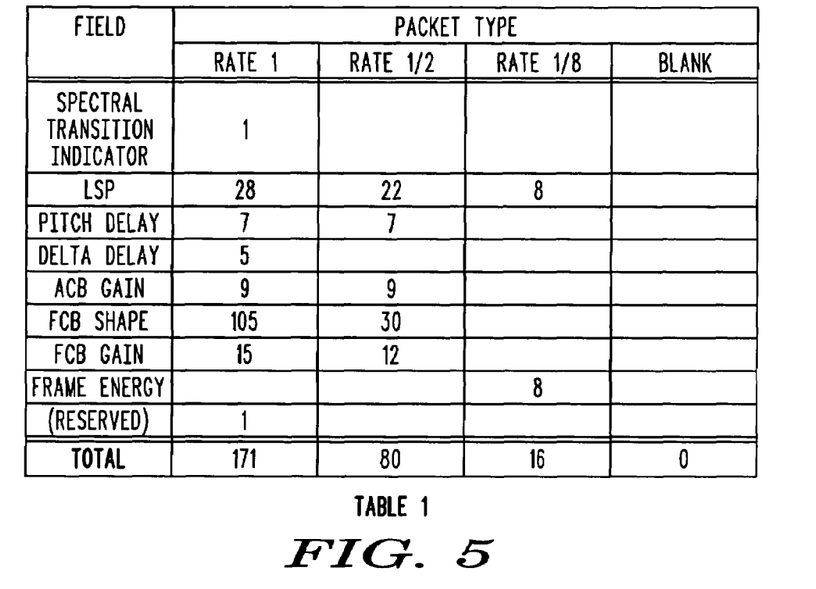
FIG. 5 illustrates bit allocations for speech parameters in a packet for various rates.

A compression algorithm uses a variation of the enhanced variable rate codec (EVRC) that is described in IS-127, published by the Telecommunications Industry Association. In that embodiment the first rate is full rate, the second rate is half rate and the third rate is eighth rate. Table 1 illustrated in FIG. 5 indicates the bit allocations for speech parameters in the three (3) standard vocoder rates of full rate (rate 1), half rate (rate ½) and eighth rate (rate ⅛). The speech parameters, as is known to those of ordinary skill in the art, may include spectral transition indicators, line spectral pairs (LSP), pitch delay, delta delay, Adaptive Code Book (ACB) gain, Fixed Code Book (FCB) gain and packet energy. As indicated in Table 1, the bit allocation for the Rate ½ packet type is similar to that of the Rate 1 packet type. Moreover, the majority of bit field parameter types (column 1) are identical in definition for both Rate 1 and Rate 1/2, with the exception being for the "Spectral Transition Indicator" and "Delta Delay" parameters, which are not used for the Rate 1/2 packet type. Although the other parameters are identical, the number of bits allocated for each of the parameters is generally reduced for the Rate ½ packet type when compared to the Rate 1 packet type. The discussion herein will be directed toward EVRC, however, the present invention is applicable to other Rate Set 1 and Rate Set 2 vocoders, as will be understood by those of ordinary skill in the art.

As indicated in FIG. 4, the speech packets encoded by the speech encoder 235 leave the vocoder 230 and are transmitted to the radio link protocol 200. The radio link protocol 200 adds a sequential sequence number to each speech packet in the order it is received and then transmits the speech packets to the circular buffer 210, as indicated by the solid line 205. Additional information such as speech encoder filter states may also be stored in the circular buffer 210.

The radio link protocol also transmits the speech packets to the multiplexer 240, which transmits the sequentially numbered speech packets to the base transmitter station 150 for transmission over the air interface 115 as a radio frequency signal. The radio frequency signal is received at the receiving mobile communication device 120, which is, for example, a cellular phone.

Due to the nature of the air interface, speech packets can be corrupted such that the receiving mobile communication device 120 cannot adequately recover the transmitted speech packet. Speech packets that are correctly received by the radio link protocol 300 are placed in circular buffer 310. The circular buffer 310 is required to delay the regeneration of the speech until adequate time has been allowed to request retransmission of any missing or corrupted packets, receive the retransmitted packets and resequence the packets. By looking at the embedded sequence numbers receiving mobile communication device 120 can determine if any speech packets were dropped during transmission. A missed or corrupted speech packet triggers transmission of a negative acknowledgment (NACK) from the receiving mobile communication device 120 to the base station controller 140 to request a retransmission of the missing or corrupted speech packet. The transmission of the negative acknowledgement is indicated by the dashed line 160 between the circular buffer 310 and the radio link protocol 200.

The previous discussion has covered the original transmission of a speech packet from a base station controller 140 and a negative acknowledgement of a dropped speech packet from a receiving mobile communication device 120 back to the base station controller 140.

When the base station controller 140 receives the negative acknowledgment at the radio link protocol 200 a signal, indicated by the dashed line 161, is sent from the radio link protocol 200 to the circular buffer 210 to retrieve the dropped speech packet. The retrieved replacement packet, if it is the first rate, is compressed to second rate by the recompression/rate reduction algorithm 220.

At the same time, the recompression/rate reduction algorithm 220 is enabled by a control signal from the radio link protocol 200 to enable a control signal to the speech encoder 235. Upon receiving the control signal from the recompression/rate reduction algorithm 220, the speech encoder 235 limits the rate of the current speech packet to at most a second rate. Thus, if there is speech activity currently received from the speech input 112 by the vocoder rather than encoding at the first rate the current speech segment will be encoded at the second rate.

As will be described in detail in the description of FIGS. 7 and 8, the second rate current packet and the second rate replacement speech packet are combined into one packet at the multiplexer 240 and transmitted with a secondary traffic type indicator to provide notice to the receiver that this retransmitted speech packet is a combined packet. If there is no current speech activity the retransmitted speech packet can be extracted from the local buffer and retransmitted at its original rate.

Figure 6:
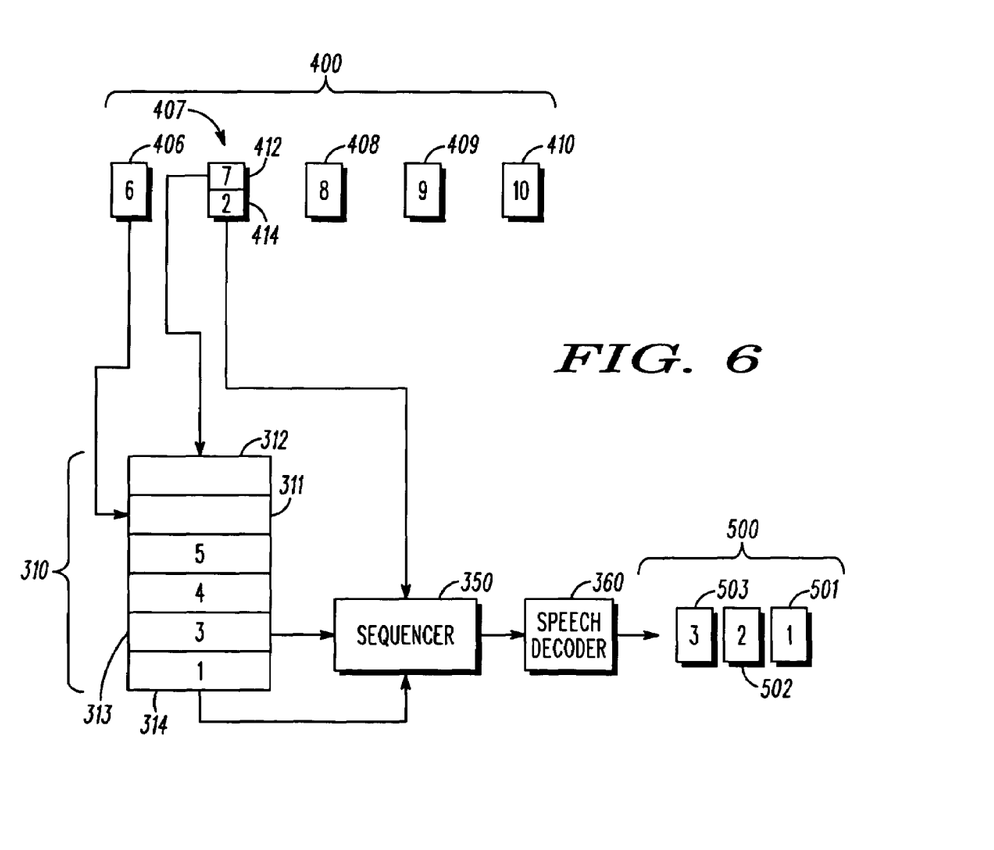
FIG. 6 illustrates in block diagram the interaction of a receiving communication device and a retransmitted packet according to the present invention.

FIG. 6 illustrates in block diagram a portion of the interaction of the receiving mobile communication device 120 and a retransmitted packet according to the present invention. A speech packet sequence 400 illustrates packets 406 having a sequence number 6, packet 408 having a sequence number 8, packet 409 having a sequence number 9, packet 410 having a sequence number 10 and a combined speech packet 407. Combined speech packet 407 is comprised of a current speech packet 412 having the sequence number 7 and a compressed replacement speech packet 414 having the sequence number 2.

Circular buffer 310 holds several speech packets, sequentially placed. A speech packet having sequence number 1 is held in slot 314 of circular buffer 310 and speech packet having sequence number 3 is held in slot 313 of circular buffer 310. The speech packet having sequence number 2 was previously dropped. The buffer also holds speech packets having sequence numbers 4 and 5 in the following unlabeled slots.

Upon receipt of speech packet sequence 400, the speech packet 406 is placed in the slot 311 of circular buffer 310 after the speech packet having sequence number 5. Then the second rate current speech packet 412 having sequence number 7 is stripped from the combined first rate speech packet 407 while the second rate replacement speech packet 414 having sequence number 2 is stripped from the combined speech packet 407. The stripped current speech packet 412 is placed in slot 312 of the circular buffer 310, while the stripped replacement speech packet 414 is sent to the sequencer 350.

The sequencer 350 organizes input speech packets in sequence. The speech packet having sequence number 1 is removed from slot 314 of circular buffer 310 and is placed in the sequencer 350. The speech packet having sequence number 3 is then removed from slot 313 of circular buffer 310 and placed in the sequencer 350. The sequencer 350 positions replacement speech packet 414 having sequence number 2 after the speech packet having sequence number 1 and before the speech packet having sequence number 3 and outputs the sequential speech packets to the speech decoder 360. Additional information may flow from the sequencer 350 to the speech decoder 360 including an indication that the current frame was recompressed or rate reduced.

In this manner, the sequential speech packets enter the speech decoder 360 according to their sequence numbers with no missing packets. The speech decoder 360 decodes the sequential speech packets and outputs a voice segment sequence 500. Voice segment sequence 500 comprises voice segment 501, voice segment 502 and voice segment 503, which are the decoded speech packets for sequence numbers 1, 2 and 3, respectively. The voice segment sequence 500 enables an uninterrupted voice sequence to be heard by a person listening to the receiving mobile communication device 120 of FIG. 1. In this manner, the information in the speech packet having the sequence number 2, which had been dropped, was retrieved as described in FIG. 4 and was decoded in proper sequence by the use of the combined speech packet 407.

Figure 7:
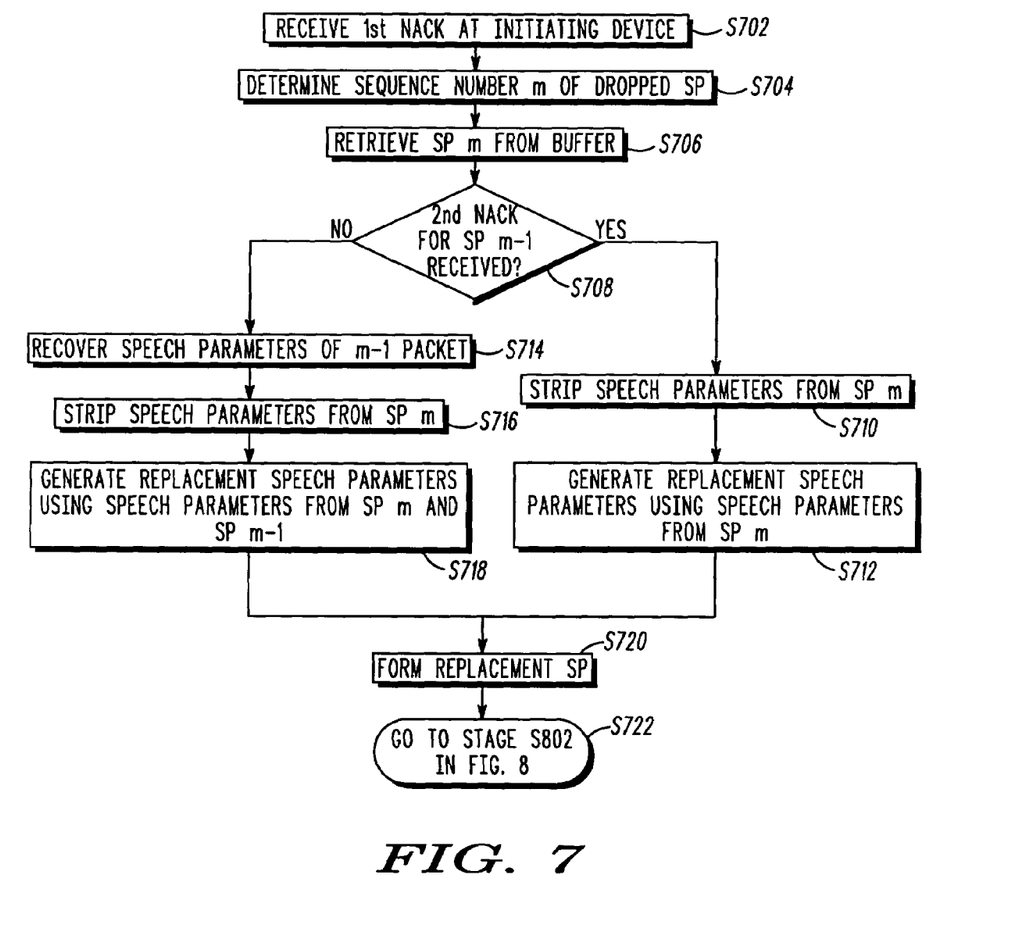
FIG. 7 illustrates a method representative of a first portion of a retransmission of a speech packet in accordance with an embodiment of the present invention.

FIG. 7 illustrates a method 700 representative of a first portion of a retransmission of a speech packet in accordance with the present invention using the wireless transmission system 100 of FIG. 1 and FIG. 4 as an exemplary embodiment. Method 700 outlines actions taken to retrieve a speech packet in order to replace the dropped speech packet. During stage S702 a first negative acknowledgement (NACK) is received at the initiating device, which may be base station controller 140. Receiving a first negative acknowledgement from a receiving communication device 120 indicates a corrupted first speech packet transmission. The receiving is done by determining the first speech packet is corrupted at a receiver buffer or circular buffer 310 of the receiving communication device 120 and transmitting the first negative acknowledgement to an initiating communication device 140. Thus, when the receiving communications device 120 determines, at the receiver buffer 310, that a first speech packet is corrupted or dropped, the first negative acknowledgement is sent to the base station controller 140.

Determining a sequence number m of the corrupted speech packet referenced by the first negative acknowledgement is done during stage S704. The sequence number m of the dropped speech package is determined from the negative acknowledgment by the radio link protocol 200. Retrieving the first speech packet from a buffer in an initiating communication device and then determining if a data rate of the retrieved first speech packet is a first rate occurs during stage S706. A first speech packet is associated with the first negative acknowledgement is retrieved when the radio link protocol 200 signals the circular buffer 210 of the initiating communication device 140 to retrieve the first speech packet for the dropped speech packet m. The circular buffer 210 holds a plurality of transmitted speech packets to be retrieved if a transmitted speech packet is dropped.

The method determines whether a preceding speech packet has been received at the receiving communication device 120 by determining if a second negative acknowledgement was received for the preceding speech packet having a sequence number m−1 and by recovering speech parameters for the preceding packet if the second negative acknowledgement was not received for the preceding speech packet.

During stage S708, it is determined by the radio link protocol 200 if a second negative acknowledgement was received for the speech packet with sequence number m−1. The speech packet with sequence number m−1 is the speech packet transmitted to the receiving mobile communication device 120 just prior to the speech packet with sequence number m.

If it is determined that a second negative acknowledgement was received for the speech packet with sequence number m−1 the flow proceeds to stage S710. During stage S710, the speech parameters of the speech packet m, which were retrieved during stage S706, are stripped from the retrieved first speech packet by the recompression/rate reduction algorithm 220. During stage S712 replacement speech parameters are generated using the speech parameters from speech packet m. During stage S720, a replacement speech packet is formed by the recompression/rate reduction algorithm 220 using the replacement speech parameters generated during stage S712. During stage S722 the flow is directed to stage S802 of method 800 in FIG. 8.

If it is determined during stage S708 that a second negative acknowledgement was not received for the speech packet with sequence number m−1, the flow proceeds to stage S714. Stripping speech parameters from the retrieved first speech packet occurs during stage S714 so the speech parameters of speech packet m−1 are recovered. The radio link protocol 200 signals the circular buffer 210 to send the speech packet with sequence number m−1 to the recompression/rate reduction algorithm 220, where the speech parameters are removed and saved. During stage S716 the speech parameters from the first speech packet m, which was retrieved during stage S706, are stripped from the speech packet m by the recompression/rate reduction algorithm 220 and saved.

Generating replacement speech parameters from the speech parameters from stripped from the retrieved first speech packet and the recovered speech parameters from the preceding speech packet occurs during stage S718. Thus, the replacement speech parameters are generated using the speech parameters from speech packet m and speech packet m−1. The replacement speech parameters are generated by applying an encoding algorithm to the speech parameters stripped from speech packet m and to the speech parameters stripped from speech packet m−1. The stripped parameters include line spectral pairs. Spectral speech parameters, such as line spectral pairs (LSP) indicated in Table 1 of FIG. 5, vary slowly from speech packet to speech packet so the spectral information on the speech parameters from speech packet m are close to the information on the speech parameter for speech packet m−1. Since the replacement packet is to be encoded at the second rate, a predictive line spectral pair is generated using 22 bits required for a second rate packet, per Table 1 of FIG. 5, that has similar quality as a non-predictive line spectral pair having 28 bits for a first rate packet. Conventionally, predictive techniques suffer from increased sensitivity to packet losses since reconstruction of a given speech packet is dependent not only on the parameters of the current speech packet, but is also dependent on the parameters from previous speech packets. So even if the current speech packet is received intact, previously dropped speech packets can contribute to distortion in the current decoded speech frame. In the present invention, the line spectral pair parameters are also dependent on past values of the line spectral pair parameters from the recovered speech parameters of speech packet m−1, but there is no increased sensitivity to packet losses since it is known that the previous packet has been received intact. Therefore, the generated replacement speech parameters will be more accurate than in the prior art.

Thus, in one embodiment, during stages S706 through S708 to S714 to S718 a first speech packet is compressed by retrieving a speech packet from a second slot in a buffer 210 and retrieving a prior speech packet from a first slot in buffer 210. The speech parameters are stripped from the retrieved prior speech packet and the retrieved speech packet. The difference between the speech parameters stripped from the retrieved prior speech packet and the speech parameters stripped from retrieved speech packet is discerned. The modified speech parameters are then formed based on the discerned differences between the speech parameters stripped from the retrieved prior speech packet and the speech parameters stripped from retrieved speech packet.

Applying the generated replacement speech parameters to the stripped retrieved first speech packet to form the replacement speech packet occurs during stage S720. The first speech packet is compressed to form the speech packet. A replacement speech packet is formed by the recompression/rate reduction algorithm 220 using the replacement speech parameters generated during stage S718. The retrieved speech packet is encoded with the modified speech parameters. During stage S722, the flow is directed to stage S802 of method 800 in FIG. 8.

In an alternate embodiment of the present invention method 700 is altered by removing stages S708, S714, S716 and S718. In that embodiment the flow proceeds from stage S706 directly to stage S710 with no check for a second negative acknowledgement. In this alternate embodiment the recompress/rate reduction algorithm 220 recovers the original speech parameters for the speech packet with sequence number m from the circular buffer 210 and generates replacement speech parameters from the speech packet m. In this alternate embodiment the recompress algorithm applies a rate reduction algorithm. In an example, the recompress algorithm applies a rate reduction algorithm as taught by U.S. Pat. No. 5,519,779, which is commonly assigned.

Figure 8:
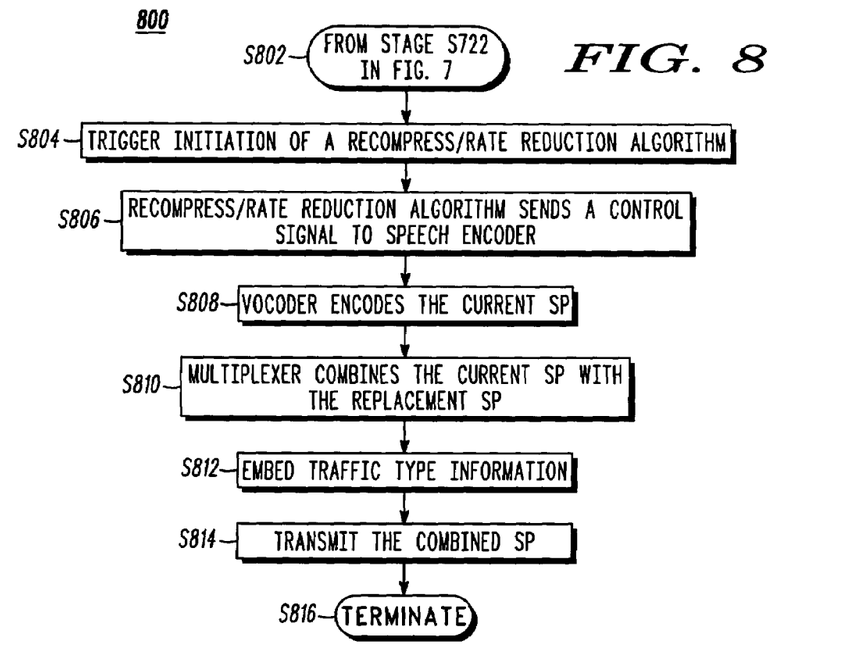
FIG. 8 illustrates a method representative of a second portion of a retransmission of a speech packet in accordance with an embodiment of the present invention.

FIG. 8 illustrates a method 800 representative of a second portion of a retransmission of a speech packet in accordance with the present invention using the wireless transmission system 100 of FIG. 1 and FIG. 4 as an exemplary embodiment. Method 800 outlines actions taken on the current speech segment of speech input 112 that is being received at the base station controller 140 when the negative acknowledgement is being received at radio link protocol 200. During stage S802, the flow is directed from stage S722 of FIG. 7. During stage 804, the radio link protocol 200 triggers an initiation of a recompress/rate reduction algorithm 220. A control signal initiates a recompress/rate reduction algorithm 220 for encoding a current segment of speech responsive to the first negative acknowledgement to form a current speech packet. During stage S806, the recompression/rate reduction algorithm 220 sends a control signal to the speech encoder 235 in the vocoder 230 requesting a second rate encoding of the current speech segment coming into the base station controller 140 as speech input 112. During stage S808, the speech encoder 235 in the vocoder 230 encodes the current speech segment into a second rate speech packet. This encoding will permit the current speech packet to be combined with the second rate replacement speech packet formed during stage S720 of FIG. 7 while using the available data rates of the wireless communication system 100.

During stage S810, the multiplexer 240 combines current speech packet with the replacement speech packet to form a combined speech packet 412 in FIG. 6. The second rate current speech packet and the second rate replacement speech packet are combined. The radio link protocol 200 has received the compressed replacement packet and the second rate current speech packet from the vocoder 230 and it transmits both packets to the multiplexer 240. The multiplexer 240 combines the second rate current speech packet and the second rate replacement speech packet to form a first rate combined speech packet (407 in FIG. 6).

In an alternate embodiment, the replacement packet is sent at the original rate if the dropped speech packet was originally at the second rate or third rate. In yet another embodiment, the dropped speech packet will be retransmitted at its original first rate if the current speech packet was formed from a voice segment with no voice activity.

During stage S812, traffic type information is embedded in the packet. Traffic type information is used indicate to the wireless transmission system 100 that this speech packet is a combined packet. A primary traffic type indication is used to indicate the current speech information and secondary traffic type indication is used to indicate the replacement speech information. Transmitting the combined speech packet occurs during stage S814. The combined speech packet with embedded secondary traffic type is transmitted to the receiving mobile communication device 120. The multiplexer has placed the combined speech packet so the embedded sequence number of the current speech packet is in proper sequence with neighboring transmitted speech packets as indicated by speech packets 406 through 410 in FIG. 6. During stage S816, method 800 terminates.

FIGS. 7 and 8, describe one embodiment of a method for forming a combined packet including encoding a current speech segment at a substantially half rate, retrieving a first speech packet, compressing the first speech packet to a substantially half rate and combining the encoded current speech segment and the compressed first speech packet to form a full rate replacement packet.

The method outlined in FIGS. 7 and 8 required retrieving a speech packet from a circular buffer 210 in a second slot then retrieving a prior speech packet from the buffer 210 in a first slot immediately preceding the second slot. The speech parameters are stripped from the retrieved prior speech packet and speech parameters are stripped from the retrieved speech packet. The difference between the speech parameters stripped from the retrieved prior speech packet and the speech parameters stripped from the retrieved speech is discerned. Modified speech parameters are formed based on the discerned difference between the speech parameters stripped from the retrieved prior speech packet and the speech parameters stripped from the retrieved speech packet. The retrieved speech packet is encoded with the modified speech parameters.

Figure 9:
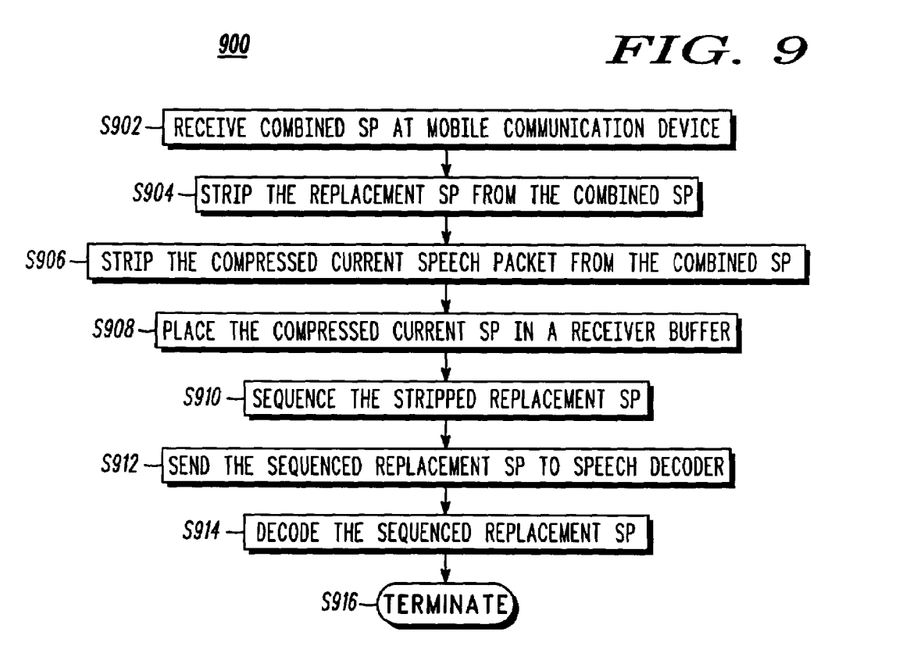
FIG. 9 illustrates a method representative of a first embodiment of the receipt of a retransmitted speech packet in accordance with the present invention.

FIG. 9 illustrates a method 900 representative of a first embodiment of the receipt of a retransmitted speech packet in accordance with the present invention using an exemplary the wireless transmission system 100 of FIG. 1 and an exemplary portion of the receiving communication device illustrated in FIG. 4. This method 900 applies to actions taken on combined speech packets received at a mobile communication device 120. During stage S902, the combined speech packet 407 is received at the receiving mobile communication device 120. The combined speech packet 407 comprises a current speech packet 412 and a replacement speech packet 414. The replacement speech packet 414 is formed by stripping speech parameters from a first speech packet, generating replacement speech parameters using the stripped speech parameters from the first speech packet and the speech parameters from a preceding speech packet, and applying the generated speech parameters to the replacement speech packet. During stage S904 the replacement speech packet 414 is stripped from the combined speech packet 407. During stage S906, the compressed current speech packet 412 is stripped from the combined speech packet 407.

During stage S908, the current speech packet 412 is placed in slot 312 of the receiver circular buffer 310. During stage S910, the stripped replacement speech packet 414 (SP) is sequenced. Sequencer 350 places the stripped replacement speech packet 414 between the speech packet held in slot 314 of circular buffer 310 and the speech packet held in slot 313 in circular buffer 310. This places the retransmitted speech packet 414 in correct order with its original neighboring speech packets, which were correctly received upon an initial transmission. During stage S912, the sequenced replacement speech packet 414 is sent to the speech decoder 360 from the sequencer 350. During stage S914, the speech decoder 360 decodes the sequenced speech packets including the replacement speech packet and outputs a voice segment sequence 500 comprising voice segments 501-503. During stage S916 the method ends.

In FIG. 9, the illustrated exemplary method for receiving a combined packet was described receiving a combined speech packet at a receiving communication device, when the combined speech packet is made of a current speech packet and a replacement speech packet. The replacement speech packet was formed at the initiating communication device 140, as described in FIG. 7, by stripping speech parameters from a first speech packet, generating replacement speech parameters using the stripped speech parameters from the first speech packet and the speech parameters from a preceding speech packet, and applying the generated speech parameters to the replacement speech packet. At the receiving mobile communication device 120 the replacement speech packet is stripped from the combined speech packet and the current speech packet is stripped from the combined speech packet.

The current speech packet is placed in a circular receiver buffer 310. The stripped replacement speech packet is sequenced in sequential position with speech packets leaving the circular receiver buffer 310. Finally the sequenced replacement speech packet is sent to a speech decoder that decodes the sequenced replacement speech packet.

Figure 10:
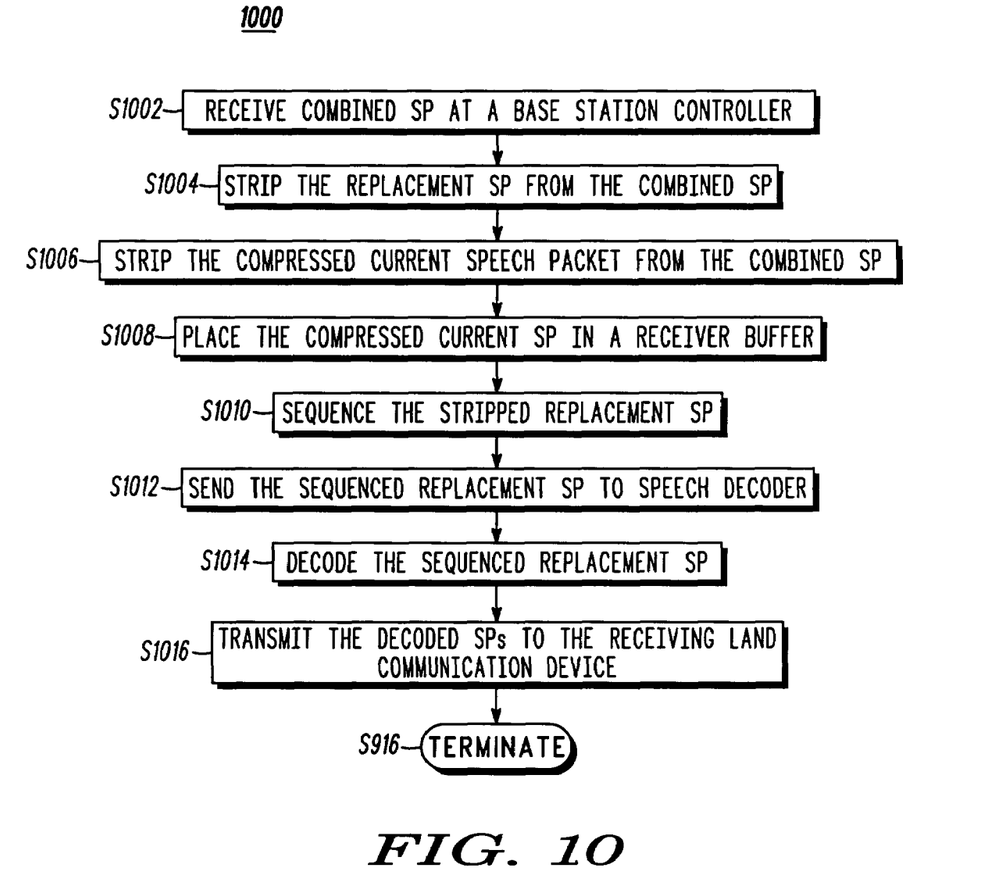
FIG. 10 illustrates a method representative of a second embodiment of the receipt of a retransmitted speech packet in accordance with the present invention.

FIG. 10 illustrates a method 1000 representative of a second embodiment of the receipt of a retransmitted speech packet in accordance with the present invention as illustrated by an exemplary wireless transmission system 102 in FIG. 3 and an exemplary portion of the receiving communication device 120 illustrated in FIG. 4. This method 1000 applies to actions taken on combined speech packets received at a land communication device 111.

During stage S1002, the combined speech packet 407 is received at the base station controller 141. During stage S1004, the replacement speech packet 414 is stripped from the combined speech packet 407. During stage S1006, the compressed current speech packet is 412 is stripped from the combined speech packet 407.

During stage S1008, the compressed current speech packet 412 is placed in slot 312 of the receiver buffer circular. During stage S1010 sequencer 350 places the stripped replacement speech packet 414 between the speech packet held in slot 314 of circular buffer 310 and the speech packet held in slot 313 in circular buffer 310. This places the retransmitted replacement speech packet 414 in correct order with its original neighboring speech packets, which were correctly received upon an initial transmission. During stage S1012, the sequenced replacement speech packet 414 is sent to the speech decoder 360 from the sequencer 350. During stage S1014, the speech decoder 360 decodes the sequenced speech packets including the replacement speech packet 414 and outputs a voice segment sequence 500 comprising voice segments 501-503. During stage S1016, the decoded speech packets are transmitted as a voice segment sequence 500 to the receiving land communication device 111. During stage S1018, the method ends.

In FIGS. 8, 9, and 10, the vocoder operation was described from the point of receiving a combined speech packet at a receiving communication device, where the combined speech packet includes a current speech packet and a replacement speech packet to the point of transmitting decoded speech packets to a receiving land communication device. A replacement speech packet was formed by stripping speech parameters from a first speech packet, generating replacement speech parameters using the stripped speech parameters from the first speech packet and the speech parameters from a preceding speech packet, and applying the generated speech parameters to the replacement speech packet. At the receiver end described in FIG. 9, the receive method includes stripping the replacement speech packet from the combined speech packet while stripping the current speech packet from the combined speech packet and placing the current speech packet in a receiver buffer. By sequencing the stripped replacement speech packet in sequential position with speech packets leaving the receiver buffer and sending the sequenced replacement speech packet to a speech decoder which decodes the sequenced replacement speech packet a packet is received and placed into the flow of data without the transmitted signal losing any voice packet.

The wireless transmission system 100 comprising an initiating land communication device 110 and a receiving mobile communication device 120 will function as illustrated in FIGS. 4-9. FIGS. 4-9 were used to illustrate a method in which dropped speech packets, even at high data rates, are retransmitted with little degradation of voice quality in a wireless transmission system 100. However, one of ordinary skill in the art appreciates that variations of the described functions are applicable to additional embodiments including wireless transmission systems 101 and 102 illustrated in FIGS. 1 and 2, respectively.

Specifically, an additional embodiment is applicable to the wireless transmission system 101 from an initiating mobile communication device 130 to a receiving mobile communication device 120 as illustrated in FIG. 2 may be envisioned.

In the embodiment relevant to FIG. 2, the dropped speech packet will be recognized at the base station controller 140 if the speech packet was dropped at the air interface 115 between the initiating mobile communication device 130 and the base transmitter station 150. In that case, the base station controller 140 will send the negative acknowledgement to the mobile communication device 130 and the vocoder internal to the mobile communication device 130 will initiate a retransmit of a combined speech packet formed in the manner described in FIGS. 4-9. Those of ordinary skill in the art will recognize that the steps described herein may be modified, as obvious variants herein, dependent upon the location of the vocoder.

In an additional embodiment relevant to FIG. 2, dropped speech packet will be recognized at the receiving mobile communication device 120, if the speech packet was dropped at the air interface 116 between the base transmitter station 151 and the receiving mobile communication device 120. Additionally, a dropped speech packet will be recognized at the receiving mobile communication device 120, if the speech packet was dropped between the base station controller 140 and base transmitter station 151.

In either of these cases, the receiving mobile communication device 120 will send the negative acknowledgement to the initiating mobile communication device 130 or the base station controller 140 or 141 to initiate a retransmit of a combined speech packet formed in the manner described in FIGS. 4-10. Those of ordinary skill in the art will recognize that the steps described herein may be modified, as obvious variants herein, dependent upon the location of the vocoder.

The interactions of land communication device 110 (FIG. 1) upon receipt of a negative acknowledgement in the wireless transmission system 100 are also applicable to the wireless transmission system 102 wherein a signal is transmitted from an initiating mobile communication device 130 to a receiving land communication device 111 as illustrated in FIG. 3.

In an additional embodiment relevant to wireless transmission system 102 of FIG. 3, the dropped speech packet will be recognized at the base station controller 141. In such an embodiment, the base station controller 141 will send the negative acknowledgement to the initiating mobile communication device 130 and the vocoder internal to the mobile communication device 130 will initiate a retransmit of a combined speech packet formed in the manner described in FIGS. 4-10. Those of ordinary skill in the art will recognize that the steps described herein may be modified, as obvious variants herein, dependent upon the location of the vocoder.

These illustrative methods and computer readable code for retransmitting a dropped speech packet by combining a current speech packet and the retransmitted speech packet, each at the second rate, to form a first rate speech packet are not intended to be exhaustive of all possibilities or to limit what can be designed for the aforementioned purpose. Those of ordinary skill in the art will recognize that the steps described herein may be modified, as obvious variants herein, to apply to any device or equipment containing a vocoder. There is therefore a multiplicity of other possible combinations and embodiments. By using what is shown and described herein, a method of retransmission of dropped speech packets is possible at high data rates. Those having ordinary skill in the art will therefore appreciate the benefit of employing a method of retransmitting vocoder data in numerous and various systems.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

What is claimed is:

1. A method for retransmitting a speech packet, the method comprising:
    receiving at a speech transmitting device a first negative acknowledgement from a receiving communication device indicative of a corrupted first speech packet transmission;
    retrieving a first speech packet associated with the first negative acknowledgement;
    compressing the first speech packet to form a replacement speech packet;
    encoding a current segment of speech responsive to the first negative acknowledgement to form a current speech packet;
    combining the current speech packet with the replacement speech packet to form a combined speech packet; and
    transmitting the combined speech packet.

2. The method of claim 1, wherein the current segment of speech is encoded at a second rate.

3. The method of claim 1, wherein the first speech packet is encoded at a first rate and the replacement speech packet is compressed at a second rate that is different from the first rate.

4. The method of claim 1, wherein receiving a first negative acknowledgement from the receiving communication device indicative of a corrupted first speech packet transmission further comprises:
    determining the first speech packet is corrupted at a receiver buffer of the receiving communication device; and
    transmitting the first negative acknowledgement to an initiating communication device.

5. The method of claim 1, wherein encoding a current segment of speech responsive to the first negative acknowledgement to form a current speech packet further comprises:
    triggering a control signal to initiate a recompression/rate reduction algorithm responsive to the first negative acknowledgement;
    sending the control signal to a speech encoder; and
    encoding the current speech packet by applying a rate reduction algorithm.

6. The method of claim 1 wherein transmitting the combined speech packet further comprises:
    embedding traffic type information to indicate the presence of the replacement speech packet and the current speech packet.

7. The method of claim 6, wherein the traffic type information comprises of primary traffic indication and secondary traffic indication.

8. The method of claim 1, wherein retrieving the first speech packet associated with the first negative acknowledgement further comprises:
    determining a sequence number m of the corrupted speech packet referenced by the first negative acknowledgement;
    retrieving the first speech packet from a buffer in an initiating communication device; and
    determining if a data rate of the retrieved first speech packet is a first rate.

9. The method of claim 8 wherein determining the sequence number m further comprises:
    determining a receive time of the first negative acknowledgement.

10. The method of claim 8, further comprising:
    determining whether a preceding speech packet has been received at the receiving communication device.

11. The method of claim 10, wherein determining whether a preceding speech packet has been received at the receiving communication device further comprises:
    determining if a second negative acknowledgement was received for the preceding speech packet having a sequence number m−1; and
    recovering speech parameters for the preceding packet if the second negative acknowledgement was not received for the preceding speech packet.

12. The method of claim 11, wherein compressing the first speech packet to form a replacement speech packet, further comprises:
    stripping speech parameters from the retrieved first speech packet;
    generating replacement speech parameters from the stripped speech parameters from the retrieved first speech packet and the recovered speech parameters from the preceding speech packet; and
    applying the generated replacement speech parameters to the stripped retrieved first speech packet to form the replacement speech packet.

13. The method of 12, wherein the stripped parameters include line spectral pairs.

* * * * *